(12) United States Patent
Mecks et al.

(10) Patent No.: US 9,333,844 B2
(45) Date of Patent: May 10, 2016

(54) METHOD AND DEVICE FOR OPERATING A DRIVE DEVICE OF A VEHICLE

(71) Applicant: Robert Bosch GmbH, Stuttgart (DE)

(72) Inventors: Michael Mecks, Vaihingen (DE); Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/394,364

(22) PCT Filed: Mar. 25, 2013

(86) PCT No.: PCT/EP2013/056204
§ 371 (c)(1),
(2) Date: Oct. 14, 2014

(87) PCT Pub. No.: WO2013/156260
PCT Pub. Date: Oct. 24, 2013

(65) Prior Publication Data
US 2015/0088351 A1    Mar. 26, 2015

(30) Foreign Application Priority Data
Apr. 16, 2012 (DE) .......................... 10 2012 206 147

(51) Int. Cl.
*B60K 1/00* (2006.01)
*B60K 8/00* (2006.01)
*B60W 50/02* (2012.01)
*B60W 20/00* (2016.01)
(Continued)

(52) U.S. Cl.
CPC ... *B60K 1/00* (2013.01); *B60K 8/00* (2013.01); *B60W 20/00* (2013.01);
(Continued)

(58) Field of Classification Search
CPC .................................... B60K 1/00; B60K 8/00

USPC ....................................................... 701/22, 99
See application file for complete search history.

(56) References Cited

U.S. PATENT DOCUMENTS 5,713,425 A * 2/1998 Buschhaus et al. ......... 180/65.25
7,710,252 B2 * 5/2010 Kaya ............................. 340/459
(Continued)

FOREIGN PATENT DOCUMENTS

| DE | 102006030157 | 1/2008 |
|---|---|---|
| DE | 102006030526 | 1/2008 |
| JP | 2003061205 | 2/2003 |

OTHER PUBLICATIONS

International Search Report for Application No. PCT/EP2013/056204 dated Jul. 9, 2013 (English Translation, 2 pages).

*Primary Examiner* — Muhammad Shafi
*Assistant Examiner* — Majdi Alsomiri
(74) *Attorney, Agent, or Firm* — Michael Best & Friedrich LLP

(57) ABSTRACT

The invention relates to a method for operating a drive device (1) of a vehicle, in particular, a motor vehicle, said device having at least one electric or hydraulic machine (2) as a drive unit. Said method consists of the following steps: determining a target drive direction (ZR) that can be set by the driver of the vehicle, detecting a current direction of travel of the vehicle and comparing the current drive direction with the target drive direction (ZR) that has been set, detecting the direction of action of a current drive force and comparing the direction of action with the target drive direction (ZR), if the current direction of travel deviates from the target drive direction (ZR), detecting/determining unauthorised driving of the vehicle, if the direction of action deviates from the target drive direction (ZR). The invention also relates to a device and a system, in particular, for performing the method.

13 Claims, 2 Drawing Sheets

(51) Int. Cl.
 *B60W 10/08* (2006.01)
 *B60W 10/184* (2012.01)
 *B60W 30/18* (2012.01)

(52) U.S. Cl.
 CPC ...... *B60W 50/0205* (2013.01); *B60W 50/0225* (2013.01); *B60W 10/08* (2013.01); *B60W 10/184* (2013.01); *B60W 30/18036* (2013.01); *B60W 30/18054* (2013.01); *B60W 30/18118* (2013.01); *B60W 2520/04* (2013.01); *B60W 2520/06* (2013.01); *B60W 2520/105* (2013.01); *B60W 2540/16* (2013.01)

(56) References Cited

U.S. PATENT DOCUMENTS

| | | | |
|---|---|---|---|
| 7,721,833 B2 * | 5/2010 | Kikuchi | 180/65.28 |
| 8,056,659 B2 * | 11/2011 | Oba et al. | 180/65.225 |
| 2006/0040777 A1 | 2/2006 | Gartner et al. | |
| 2008/0109139 A1 | 5/2008 | Muta et al. | |
| 2009/0312929 A1 * | 12/2009 | Doebele et al. | 701/66 |
| 2011/0046829 A1 | 2/2011 | Tamai et al. | |
| 2011/0083917 A1 | 4/2011 | Badreddine et al. | |

* cited by examiner

METHOD AND DEVICE FOR OPERATING A DRIVE DEVICE OF A VEHICLE

BACKGROUND OF THE INVENTION

The invention relates to a method for operating a drive device of a vehicle, in particular a motor vehicle, which has at least one electric or hydraulic machine as a drive unit. In addition, the invention relates to a corresponding device and to a system.

Modern motor vehicle drive trains usually do not have direct measurement of currently generated drive torques for reasons of cost. The torque output or power output of a drive unit therefore cannot be determined directly. In particular in the case of hybrid vehicles or electric vehicles whose drive devices have at least one electric or hydraulic machine as a drive unit, in particular in addition to a conventional internal combustion engine, there can be frictional engagement between one or more of these drive units and the driven wheels of the motor vehicle even in the case of a stationary vehicle. A faulty torque output or power output of the at least one drive unit, for example owing to a communication error or a software error or fault in an on-board component, can cause a safety-critical incorrect movement of the vehicle. In the case of vehicles with an electric or hydraulic machine as a drive unit, a reverse gear speed in the transmission is frequently dispensed with if such a reverse gear speed is provided at all. If a reverse gear speed is desired in this case, a change of direction of rotation of the drive unit takes place compared to the direction of rotation in the case of forward travel. The change in the direction of rotation is brought about by a changed actuation, for example by a changed direction of rotation of the magnetic field of a three-phase machine which is provided as a drive unit. In addition to component faults or software errors, faults in the power cabling, the sensor cables of a rotor position sensor or rotational speed sensor or incorrect orientation of sensor components relative to the shaft or to the housing of the drive unit can lead to a torque which acts in the wrong direction. When the vehicle starts, this would lead to a vehicle movement in the wrong direction of travel. In particular if persons are located in the vicinity of the vehicle, this results in a situation which is extremely safety-critical.

SUMMARY OF THE INVENTION

The method according to the invention has the advantage that starting of the vehicle in an incorrect or undesired direction can be reliably detected and prevented. According to the invention, there is provision here that firstly a target drive direction which can be predefined by the driver of the vehicle is determined, and a current direction of travel of the vehicle is detected and then compared with the predefined target drive direction, wherein if the current direction of travel deviates from the target drive direction, the direction of action of a current drive force is detected and compared with the target drive direction. In this context there is provision according to the invention that if the direction of action deviates from the target drive direction, unauthorized operation of the drive of the vehicle is detected or determined. Unauthorized operation of the drive of the vehicle is to be understood as meaning operation of the drive of the vehicle in the wrong direction, that is to say the direction opposed to the target drive direction. By comparing the drive direction with the target drive direction, it is initially checked whether the vehicle is already moving in the desired direction. By comparing the direction of action of the current drive force with the target drive direction, it is detected whether the current direction of travel is a permitted direction of travel.

If the vehicle is located, for example, with the "forward" target direction of travel on a slope, given a sufficiently high positive tractive force or drive force at the driven wheels, the downgrade force is overcome and forward-directed starting then occurs up the slope with a positive vehicle speed which becomes established. As a product of the positive tractive force and of the positive vehicle speed, a positive power results which has to be implemented by the drive unit which operates as a motor in this case and has to be made available by an energy store or energy supplier. The electric machine or the hydraulic machine then generates a positive torque in the case of a positive rotational speed. For example, a battery or a hydraulic accumulator is possible as an energy store or energy supplier.

If the positive tractive force/drive force is not sufficient to overcome the downgrade force, for example because the driver does not sufficiently activate the accelerator pedal, the vehicle can move rearward, that is to say can move rearward down the slope counter to the target drive direction. In this case, a negative vehicle speed arises in the case of a positive tractive force, for example in the case of a positive drive force. A resulting product is a negative drive power, which then has to be implemented by the drive unit which operates as a generator and has to be taken up, for example, by the above-mentioned energy store. The electric or hydraulic machine then generates a positive torque in the case of a negative rotational speed, that is to say operates as a generator. The driver can consciously bring about this state, for example during a parking process on a slope. Since the drive force in this case acts in the correct direction, and when the accelerator pedal is depressed the vehicle would move in the desired target drive direction, this case does not constitute a fault situation which has to be detected or unauthorized operation of the drive of the vehicle. Therefore, the actual direction of movement of the vehicle is not the only decisive factor for the detection of an unauthorized operation of the drive.

In contrast, a negative drive force must not be set in the case of a predefined "forward" target direction of travel and a negative vehicle speed, that is to say a current "rearward" direction of travel. A negative drive force/tractive force would in this case bring about strong, safety-critical operation of the drive counter to the target direction of travel, associated with a positive power in the motor operating mode of the drive unit and a corresponding power output of the energy store or of the energy supplier to the drive unit. Correspondingly, a positive tractive force/drive force, which therefore drives in the wrong direction of travel, must not be set in the case of the "rearward" target direction of travel and of a current direction of travel counter to the target direction of travel, that is to say "forward", that is to say in the case of a positive vehicle speed. In this case, unauthorized operation of the drive is therefore also detected.

The method therefore easily and reliably ensures a situation in which, in the case of a vehicle movement counter to the target drive direction, no operation of the drive or no motor operating mode of the drive unit is set counter to the target drive direction. In certain cases, as mentioned, a current direction of travel counter to the target drive direction is authorized provided that a motor operating mode in the direction of travel does not occur or that a positive power is not implemented by the drive unit.

Preferably, in order to determine the target drive direction, a position of a gear speed selector lever which can be operated by the driver is detected. The driver therefore predefines the target drive direction, for example, by predefining a selector lever position D for forward travel or R for rearward travel. The desired target drive direction can therefore be easily inferred from the detection of the selector lever position.

According to one advantageous development of the invention, there is provision that the current direction of travel is determined from a current speed. In this context, the level of the speed is not necessarily significant, but rather initially only whether the speed is positive or negative. In the case of a positive speed, a "forward" direction of travel is preferably detected, while in the case of a negative speed, a "rearward" direction of travel is determined. One or more sensor signals are particularly preferably taken into account for the determination of the current speed, said sensor signals not being used in the actuation of the drive unit, with the result that the speed can be detected redundantly.

Therefore, in order to determine the current speed, at least one rotational speed, preferably a plurality of rotational speeds, of the drive device are preferably detected or measured. From these rotational speeds it is then easily possible to calculate the current speed. If a plurality of rotational speeds are detected and corresponding speeds are calculated, an average speed can be formed, the plausibility of the speed detected by a sensor can be checked or said speed can be averaged.

According to one advantageous development of the invention, there is provision that unauthorized operation of the drive is detected only if the direction deviates from the target drive direction and a predefinable limiting speed is exceeded. There is particularly preferably provision that the method is not activated or carried out until in the case of a "forward" target drive direction the specific speed undershoots a negative limiting speed, that is to say the vehicle moves rearward counter to the target drive direction. Correspondingly, the method becomes active if, in the case of a "rearward" target drive direction, the determined speed exceeds a positive limiting speed, that is to say the vehicle moves forward, counter to the target direction of travel.

The direction of action of the current drive force can also be taken into account within the scope of a determination of the drive power. The power is preferably determined from the product of the drive force and speed of the vehicle. The current drive power is preferably compared with a predefinable limiting power and unauthorized operation of the drive is detected only in the case of the limiting power being exceeded. The drive power is preferably determined from the product of the determined speed and the sum of all the drive forces of the driven wheels. Unauthorized operation of the drive is expediently determined/detected if the drive power is positive in the case of a vehicle movement counter to the target drive direction.

In the case of the determination of the current drive power, efficiency levels of further consumers or of the drive units are particularly preferably taken into account. In particular, the power of further consumers such as, for example, of electrically driven or hydraulically driven secondary units, is also taken into account. Efficiency levels of the drive device are preferably taken into account in the form of electrical, magnetic and/or mechanical losses. These losses are preferably determined as a function of the operating state, by means of stored values, for example in the form of characteristic curves or characteristic diagrams. The predefinable limiting power is preferably predefined as a function of the operating state of the vehicle. According to one advantageous development of the invention, there is provision that the amount by which the drive power exceeds the limiting power is integrated over time and a fault situation is detected if the integrated value exceeds a further threshold.

In order to determine the drive force, current or voltage of one or more electrical energy stores or energy converters, or the pressure flow or volume flow of one or more hydraulic energy stores or energy converters are preferably taken into account. As a result, data from sensors assigned to the drive units are not evaluated but instead redundant values are determined. This increases the safety even when sensor faults occur.

According to one advantageous development of the invention, there is provision that during the detection of unauthorized operation of the drive, the at least one drive unit is switched off or is supplied with a reduced torque, and/or in that a brake device of the vehicle is activated. All the drive units are preferably switched off during the detection of unauthorized operation of the drive. In addition, the service brake is preferably activated in order to brake the vehicle which is, under certain circumstances, already moving. According to one advantageous development, there is provision that the detection of unauthorized operation of the drive in the case of a vehicle movement counter to the target drive direction occurs only if the absolute value of the vehicle speed exceeds a predefined threshold.

The device according to the invention gives rise to the advantages already specified above. Said device is defined by means which determine a target drive direction which is predefined by the driver, detect a current direction of travel and compare it with the predefined target drive direction, detect a direction of action of a current drive force and compare it with the target drive direction, and which means, if the current direction of travel deviates from the target drive direction, detect unauthorized operation of the drive of the vehicle if the direction of action deviates from the target drive direction. Further advantages and developments of the device emerge from what has already been described above. In particular there is provision that the means comprise a control unit which is assigned to the drive device and is connected/can be connected to the respective sensors and which drives at least one drive unit and, under certain circumstances, the brake device of the vehicle as described above.

The invention also relates to a system, in particular a drive device of a vehicle, in particular a motor vehicle, having at least one electric or hydraulic machine as a drive unit, which is operatively connected to the driven wheels of the drive device. In this context there is provision that the system comprises/has the device described above.

BRIEF DESCRIPTION OF THE DRAWINGS

In the text which follows, the invention will be explained in more detail with reference to the drawing, in which.

DETAILED DESCRIPTION

Figure 1:
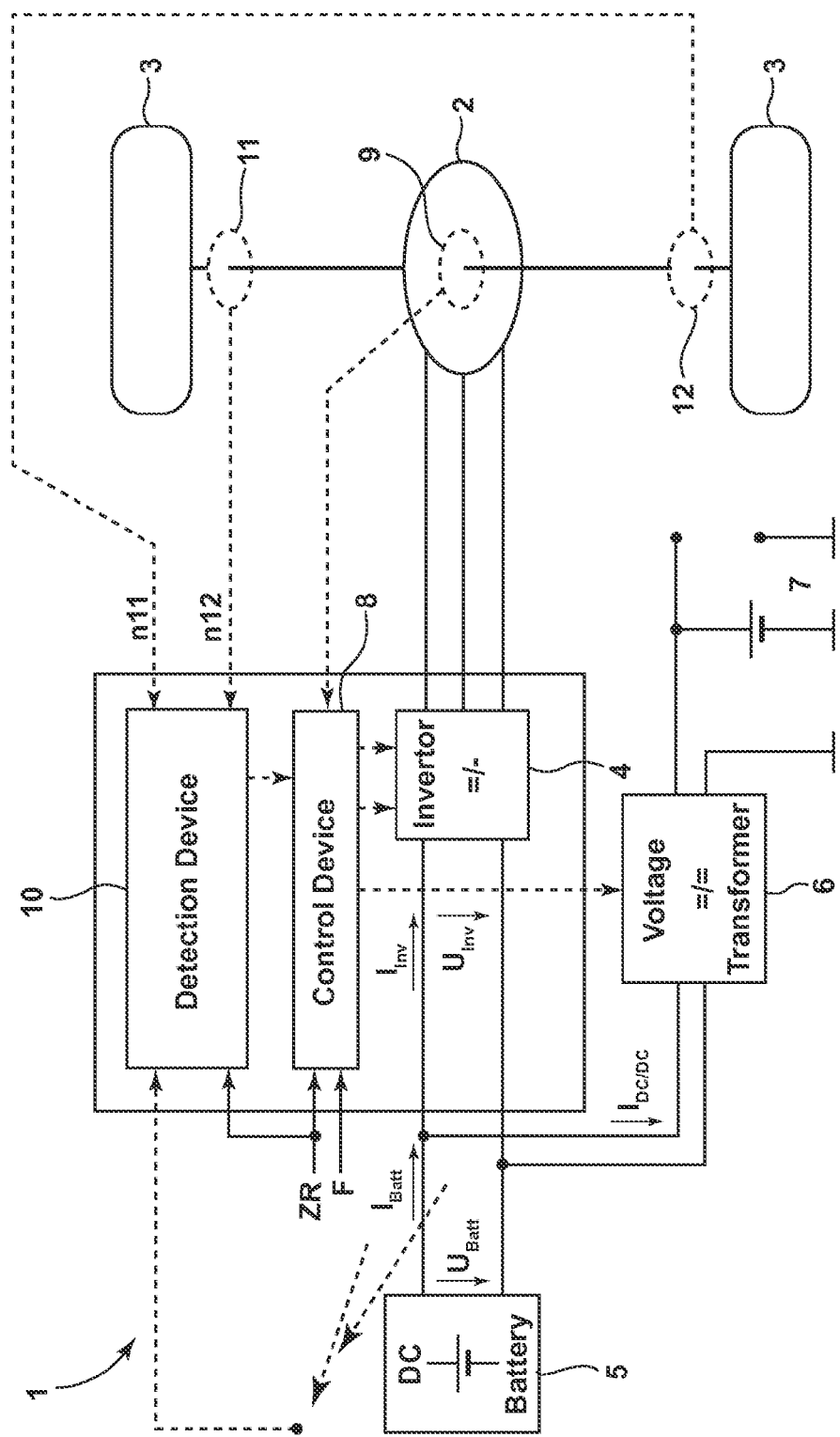
FIG. 1 shows a drive device of an electric vehicle in a simplified illustration.

FIG. 1 shows an exemplary embodiment of a drive device 1 which is embodied as an electric drive device of an electric vehicle. A drive unit of the drive device 1, which is embodied as an electric machine 2, is coupled to driven wheels 3, an optional transmission is not illustrated. The electric machine 2 is embodied as a three-phase machine and is fed by an inverter which converts the direct current of a high-voltage battery 5 into a three-phase current. The high-voltage battery 5 is coupled as an energy store to a direct voltage transformer 6 which supplies a low-voltage on-board power system 7 of the vehicle. The magnitude and phase angle or direction of rotation of the three-phase current result in the level and direction of action of the torque generated by the electric machine 2 at a particular time. In order to determine the correct phase currents, the current rotational angle of the rotor of the electric machine 2 relative to the three-phase current of a stator of the electric machine 2 is signaled to the inverter 4 or a control device 8, assigned to the inverter 4 by a rotor position signal transmitter 9 of said electric machine 2. Likewise, the voltage $U_{Inv}$ and the current $I_{Inv}$ at the direct-current-side terminals of the inverter 4 are determined and used or taken into account in the algorithm to set the torque of the electric machine 2 or to generate the three-phase currents.

The driver of the vehicle predefines a desired target drive direction by activating a gear speed selector lever (not illustrated here). The position of the gear speed selector lever is monitored and, depending on the position of the gear speed selector lever, it is detected whether forward or rearward travel is predefined by the driver as the target drive direction. In particular, there is provision that by detecting the selector lever position "D", "forward travel" is predefined as the target drive direction, and by detecting the selector lever position "R", "rearward travel" is predefined as the target drive direction. The target drive direction ZR which is selected by the driver is signaled to the control device 8. In addition, the control device 8 also receives a signal F which represents the instantaneous accelerator pedal activation of the driver. The control device 8 determines a driver's request torque from the values obtained, on the basis of which driver's request torque, the torque for the electric machine 2 is calculated.

Furthermore, a detection device 10 is provided which detects unauthorized operation of the drive of the vehicle. The detection device 10 also receives as an input signal the target drive direction ZR from the engaged selector lever position, wherein a second, redundant path is preferably provided in the evaluation of the lever position. The detection device 10 also receives information about the current $I_{Batt}$ and the battery voltage $U_{Batt}$ and the rotational speeds $n_{11}$ and $n_{12}$ of rotational speed sensors 11, 12, which are each assigned to one of the driven wheels 3.

Figure 2:
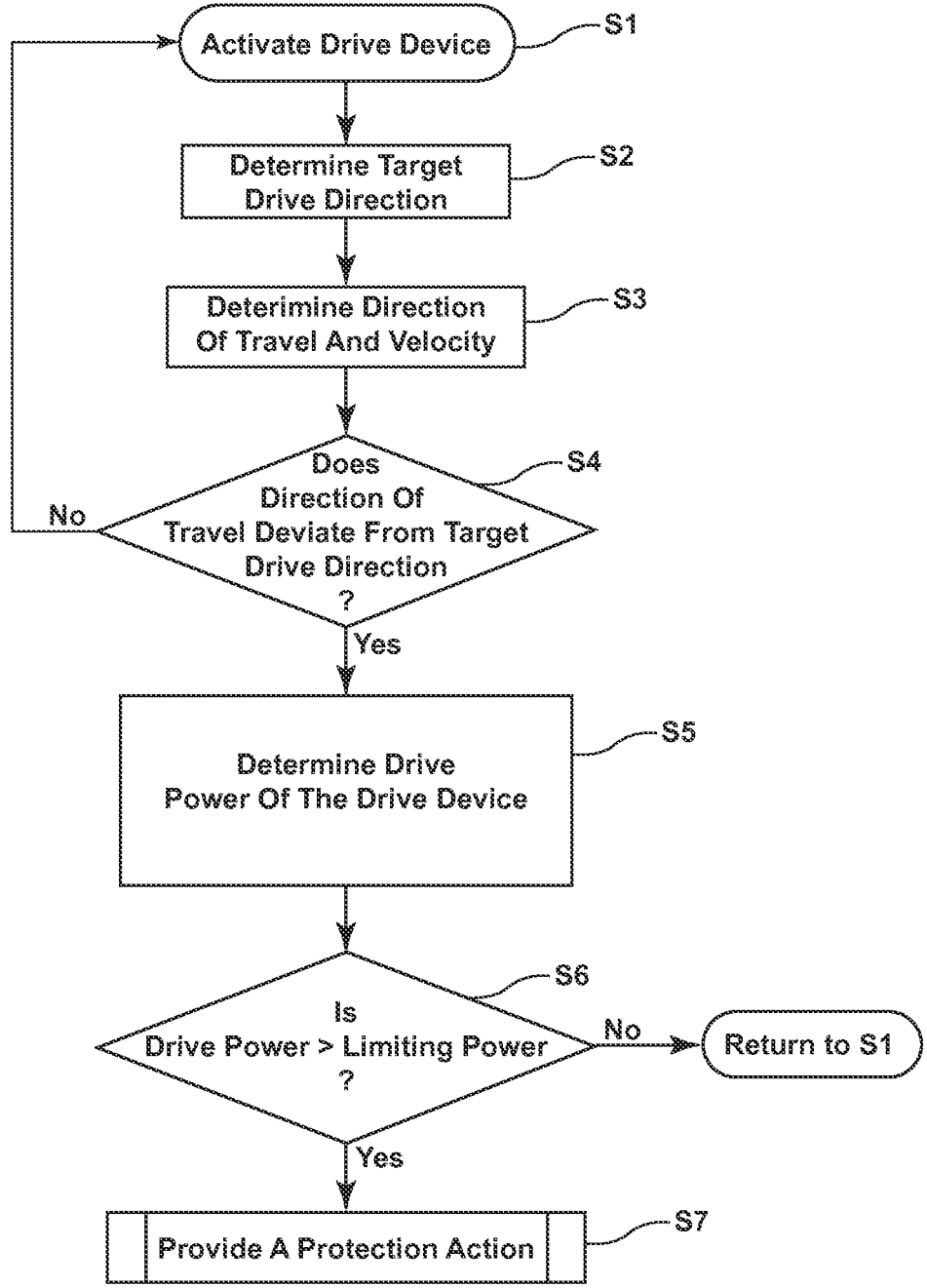
FIG. 2 shows a flowchart relating to the detection of unauthorized operation of the drive of a vehicle having the drive device.

With reference to FIG. 2, the method of functioning of, in particular, the detection device 10 will now be explained in more detail. In this respect, FIG. 2 shows a flowchart which starts with the activation of the drive device 1 in a first step S1. In a subsequent second step S2, the target drive direction, which corresponds to the selector lever position, is firstly determined in order to detect whether the driver would like to drive forward or rearward. In the next step S3, the current direction of travel and preferably also the current velocity of the vehicle are determined. For this purpose, the detection device 10 evaluates the rotational speed signals $n_{11}$ and $n_{12}$ of the rotational speed sensors 11 and 12. Since sensors or data provided for operating the drive unit, specifically the electric machine 2, are not used to detect the current direction of travel and the speed, redundancy against failure of a sensor is obtained. The current vehicle speed is determined from the sensor signals $n_{11}$ and $n_{12}$, which are preferably averaged. The direction of travel is also known from knowledge of the speed. In the case of a positive speed, the vehicle moves forward, and in the case of a negative speed it moves rearward. It would also be conceivable additionally or alternatively to use a rotational speed sensor in a transmission or a signal generator for a speedometer signal. If more than one electric machine 2 are provided as drive units, the plausibility of the individual drive unit rotational speeds can be checked with respect to one another, and in the case of correspondence they can form the basis for the vehicle speed.

In the following step S4, the current direction of travel which is determined in step S3 is compared with the target drive direction. In particular it is checked whether in the case of a "forward" target drive direction the vehicle speed undershoots a negative speed threshold, and the current direction of travel therefore deviates from the target drive direction, or whether in the case of a "rearward" target drive direction the vehicle speed exceeds a positive speed threshold, and the current direction of travel therefore points away from the target drive direction. If the target drive direction and the current direction of travel correspond (n), the method is repeated from step Si. If the current direction of travel deviates from the target drive direction (j), the method is continued in the following step S5. In this step S5, the current drive power of the drive device 1 is determined. For this purpose, the instantaneous battery power is firstly determined from the voltage $U_{Batt}$ and the current $I_{Batt}$ of the high-voltage battery 5. The battery power of electric secondary units is subsequently corrected in the exemplary embodiment by the instantaneous power of the direct voltage transformer 6 while taking into account the instantaneous current $I_{DC/DC}$. This results in the power $P_{Inv}$ at the direct-current-side terminals of the inverter 4. Furthermore, the direct-current-side inverter power $P_{Inv}$ is corrected by the losses of the inverter 4, which are stored, for example, in a characteristic diagram as a function of the temperature, battery voltage and operating point (vehicle speed, driver's request torque). This results in the phase-current-side inverter power. This is in turn corrected by operating-point-dependent electrical and magnetic losses (stored in characteristic diagrams) of the electric machine 2. The mechanical power of the electric machine 2 is obtained. Furthermore, the mechanical power of the electric machine is corrected by drive train losses, for example in the bearing systems, transmission losses, shaft sealing rings or the like which depend, for example, on the driver's request torque and the current speed of the vehicle (characteristic diagrams). The drive power at the wheel hubs or driven wheels 3 is obtained. If necessary, the drive power at the driven wheels 3 is corrected by the rolling friction and rolling step, which results in the current drive power of the vehicle.

The drive power which is determined in this way is compared with a predefinable power limit of, for example, 300W, in the subsequent step S6. If the determined drive power exceeds the limiting power (j), unauthorized operation of the drive of the vehicle is detected. Otherwise (n), the method is restarted at step S1.

The detection unit 10 therefore determines the target drive direction predefined by the driver of the vehicle, detects a current direction of travel and compares this with the target drive direction, and if the current direction of travel deviates from the target drive direction, it compares the direction of action of a current drive force in the form of the drive power with the target drive direction. If these differ from one another, unauthorized operation of the drive of the vehicle is detected. The detection device 10 therefore ensures that in the case of a "forward" target drive direction and of a vehicle movement counter to the target drive direction, that is to say a negative vehicle speed, no negative torque of an electric machine 2 is set and no negative tractive force is set at the driven wheels 3. Correspondingly, it ensures that in the case of a "rearward" target drive direction and of a vehicle movement counter to this target drive direction, that is to say in the case of a positive vehicle speed, no positive torque of an electric machine 2 is set and no positive tractive force, and thus a tractive force which drives in the wrong direction, is set at the driven wheels 3. This has to be ensured by the control unit 8 during the evaluation of the accelerator pedal signal F. In order to determine the vehicle speed, the control unit 8 utilizes the rotational angle signal of the rotor position signal transmitter 9, on the basis of which the rotational speed of the electric machine 2 is determined, and determines the current vehicle speed therefrom. The detection device 10 therefore detects unauthorized operation of the drive if the drive power is positive in the case of a vehicle movement counter to the target drive direction, and in particular exceeds the limiting power. The core of the method is therefore to detect unauthorized operation of the drive in the direction of travel counter to the target drive direction by considering/taking into account the implemented drive power, as a function of the target drive direction predefined by the driver.

As an alternative to exceeding the limiting power, the drive power of the vehicle or of the drive device 1 can be summed or integrated over time. Unauthorized operation of the drive is detected if the integrated value exceeds a corresponding predefined limiting value. As a result, debouncing can be performed, for example in order to detect no incorrect detection of unauthorized operation of the drive when operating train oscillations are present.

If it is detected in step S6 that the drive power exceeds the limiting power (j), in the subsequent step S7 a protection action is carried out. This comprises, in particular, the electric machine 2 being switched off. Alternatively it is also conceivable to provide a torque reduction of the electric machine 2 instead of the switching off. In addition, a brake device of the vehicle can be activated in order to brake the vehicle, in particular in the stationary state.

The power $P_{Inv}$ at the direct-current-terminals of the inverter 4 can also be determined from the product of the voltage $U_{Inv}$ measured in the inverter 4 and the current $I_{Inv}$ measured in the inverter 4, but otherwise the procedure presented above provides redundancy with respect to sensor data. Likewise, the phase-current-side inverter power can be determined from phase currents and phase voltages. Redundant detection for checking the plausibility of the phase currents and phase voltages is then advantageous.

While according to the present exemplary embodiment the control device 8 and the detection device 10 are provided as components which are separate from one another or preferably control units, it is, of course, also conceivable to integrate these into a common control unit.

During the ongoing operation, the plausibility of the drive power which is determined in the detection device 10 is preferably checked against an electric machine power which is calculated in the control device, in order to detect faults in the detection device 10 or in the sensors which are used by the detection device 10.

The invention claimed is:

1. A method for operating a drive device of a vehicle, which includes at least one from the group consisting of an electric machine and a hydraulic machine as a drive unit, the method comprising:
   determining a target drive direction which is predefined by a vehicle driver of the vehicle,
   detecting a current direction of travel of the vehicle and comparing the current direction of travel with the predefined target drive direction,
   detecting the direction of action of a current drive force and comparing the direction of action with the target drive direction to determine when the current direction of travel deviates from the target drive direction,
   detecting/determining unauthorized operation of the drive unit of the vehicle when the direction of action of the current drive force deviates from the target drive direction, and
   during the detection of unauthorized operation of the drive unit, a controller operating to perform at least one of: switch off the drive unit, supply the drive unit with a reduced torque, and activate a brake device of the vehicle.

2. The method as claimed in claim 1, wherein determining a target drive direction, includes detecting a position of a gear speed selector lever which can be operated by a vehicle driver.

3. The method as claimed in claim 1, wherein the current direction of travel is determined from a current speed.

4. The method as claimed in claim 3, wherein in order to determine the current speed, at least one rotational speed is detected.

5. The method as claimed in claim 1, wherein unauthorized operation of the drive is detected only if a predefinable limiting speed is exceeded or undershot.

6. The method as claimed in claim 1, wherein current driving power of the drive unit is determined and is compared with a predefinable limiting power, and unauthorized operation of the drive unit is detected when the limiting power is exceeded by the current driving power, wherein the predefinable limiting power is predefined as a function of the operating state of the vehicle, and an amount by which the drive power exceeds the predefinable limiting power is integrated over time and a fault situation is detected when the integrated value exceeds a further threshold.

7. The method as claimed in claim 6, wherein efficiency levels of the drive unit are taken into account in the determination of the driving power.

8. The method as claimed in claim 1, the at least one drive unit comprising one of a plurality of individual three-phase electric machines, and the method including determining the plausibility of the rotational speeds of the three-phase electric machines with respect to each other.

9. The method as claimed in claim 8, including checking the plausibility of phase currents and phase voltages to provide redundancy.

10. The method as claimed in claim 1, wherein the drive unit comprises an electric machine, the method including operatively connecting the drive unit directly to drive wheels or a drive shaft of the vehicle.

11. A drive device of a motor vehicle, the drive device comprising:
   at least one electric or hydraulic machine as a drive unit, which is operatively directly connected to driven wheels of the drive device, and
   a controller configured to
   determine a target drive direction which is predefined by a vehicle driver,
   detect a current direction of travel and compare it with the predefined target drive direction,
   detect a direction of action of a current drive force and compare the direction of action with the target drive direction when the current drive direction deviates from the target drive direction,
   detect unauthorized operation of the drive unit of the vehicle when the direction of action of the current drive force deviates from the target drive direction, and
   during the detection of unauthorized operation of the drive unit, operating to perform at least one of: switch off the drive unit, supply the drive unit with a reduced torque, and activate a brake device of the vehicle.

12. A method for operating a drive device of a vehicle, which has at least one electric or hydraulic machine as a drive unit, the method comprising:
- determining a target drive direction which is predefined by a vehicle driver of the vehicle,
- detecting a current direction of travel of the vehicle and comparing the current direction of travel with the predefined target drive direction,
- detecting the direction of action of a current drive force and comparing the direction of action with the target drive direction when the current direction of travel deviates from the target drive direction,
- determining driving power of the drive device when the direction of action deviates from the target drive direction,
- comparing driving power of the drive device with a predefinable limiting power, and
  - detecting unauthorized operation of the drive device when the predefinable limiting power is exceeded by the driving power, and
  - during the detection of unauthorized operation of the drive unit, a controller operating to perform at least one of: switch off the drive unit, supply the drive unit with a reduced torque, and activate a brake device of the vehicle.

13. The method as claimed in claim 12, wherein the predefinable limiting power is predefined as a function of the operating state of the vehicle, and an amount by which the drive power exceeds the predefinable limiting power is integrated over time and a fault situation is detected when the integrated value exceeds a further threshold.

* * * * *